(12) United States Patent
Klasing et al.

(10) Patent No.: US 8,307,943 B2
(45) Date of Patent: Nov. 13, 2012

(54) HIGH PRESSURE DROP MUFFLING SYSTEM

(75) Inventors: Kevin Samuel Klasing, Cincinnati, OH (US); Bradley Willis Fintel, Cincinnati, OH (US); John Carl Glessner, Cincinnati, OH (US); Jeffrey Lee Mason, Cincinnati, OH (US); Christopher Jon Potokar, Cincinnati, OH (US); Robert Proctor, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/178,159

(22) Filed: Jul. 7, 2011

(65) Prior Publication Data
US 2012/0006615 A1     Jan. 12, 2012

Related U.S. Application Data

(60) Provisional application No. 61/363,506, filed on Jul. 12, 2010.

(51) Int. Cl.
*F01N 1/08* (2006.01)
*F01N 1/00* (2006.01)

(52) U.S. Cl. ............. 181/210; 181/258; 138/39; 138/40

(58) Field of Classification Search .................. 181/210, 181/217, 218, 233, 258, 264, 270, 281, 231; 138/37, 39, 40–46
See application file for complete search history.

(56) References Cited

U.S. PATENT DOCUMENTS

| | | | | |
|---|---|---|---|---|
| 700,785 | A | | 5/1902 | Kull |
| 1,473,349 | A | * | 11/1923 | Kach ............................ 48/189.4 |
| 1,539,595 | A | * | 5/1925 | Powell .......................... 181/281 |
| 1,697,794 | A | | 1/1929 | Stranahan |
| 1,794,276 | A | | 2/1931 | Bowes |
| 2,701,557 | A | * | 2/1955 | Ramey .......................... 123/593 |
| 2,919,761 | A | * | 1/1960 | Smith ............................ 181/272 |
| 2,929,248 | A | * | 3/1960 | Sprenkle ......................... 73/198 |
| 3,016,972 | A | * | 1/1962 | Dugas ........................... 181/268 |
| 3,092,206 | A | * | 6/1963 | Moreau ......................... 181/270 |
| 3,105,570 | A | * | 10/1963 | Bezemes ........................ 181/268 |
| 3,120,877 | A | * | 2/1964 | Morris et al. .................. 181/217 |
| 3,159,238 | A | * | 12/1964 | Shearer ......................... 181/213 |
| 3,191,630 | A | * | 6/1965 | Demyan ......................... 138/42 |
| 3,338,331 | A | | 8/1967 | Jettinghoff |

(Continued)

FOREIGN PATENT DOCUMENTS
EP     2136053 A2     12/2009
(Continued)

OTHER PUBLICATIONS

GB Search Report and Opinion issued Oct. 26, 2011 in corresponding Application No. GB1112835.2.

(Continued)

*Primary Examiner* — Edgardo San Martin
(74) *Attorney, Agent, or Firm* — General Electric Company; Matthew P. Hayden; David J. Clement

(57) ABSTRACT

A system for venting a high-pressure flow stream is disclosed, the system comprising a device having a plurality of orifice plates, each orifice plate having a plurality of orifices, wherein the plurality of orifice plates are oriented relative to each other such that the pressure of the flow stream substantially drops.

23 Claims, 11 Drawing Sheets

U.S. PATENT DOCUMENTS

| | | | |
|---|---|---|---|
| 3,398,881 A | 8/1968 | Greenberg et al. | |
| 3,493,169 A | 2/1970 | Abild et al. | |
| 3,545,492 A * | 12/1970 | Scheid, Jr. | 138/42 |
| 3,572,391 A * | 3/1971 | Hirsch | 138/40 |
| 3,632,223 A | 1/1972 | Hampton | |
| 3,665,965 A * | 5/1972 | Baumann | 138/42 |
| 3,692,140 A | 9/1972 | Smith | |
| 3,777,489 A | 12/1973 | Johnson et al. | |
| 3,840,051 A * | 10/1974 | Akashi et al. | 138/37 |
| 3,945,759 A | 3/1976 | Bobo | |
| 3,951,566 A | 4/1976 | Mattei et al. | |
| 3,964,519 A * | 6/1976 | De Baun | 138/37 |
| 4,022,112 A | 5/1977 | Putt et al. | |
| 4,113,050 A * | 9/1978 | Smith | 181/230 |
| 4,128,769 A | 12/1978 | Bons et al. | |
| 4,130,173 A * | 12/1978 | Cooksey | 181/212 |
| 4,132,285 A | 1/1979 | Milde et al. | |
| 4,142,413 A * | 3/1979 | Bellinga | 73/198 |
| 4,156,344 A | 5/1979 | Cuthbertson et al. | |
| 4,177,780 A * | 12/1979 | Pellerin | 123/590 |
| 4,244,440 A | 1/1981 | Matta et al. | |
| 4,244,441 A | 1/1981 | Tolman | |
| 4,375,841 A * | 3/1983 | Vielbig | 181/272 |
| 4,610,326 A | 9/1986 | Kirchweger et al. | |
| 4,685,533 A | 8/1987 | Piesik | |
| 4,890,691 A * | 1/1990 | Ching-ho | 181/264 |
| 4,979,587 A | 12/1990 | Hirt et al. | |
| 5,205,719 A | 4/1993 | Childs et al. | |
| 5,266,754 A * | 11/1993 | Swift | 181/230 |
| 5,327,941 A * | 7/1994 | Bitsakis et al. | 138/42 |
| 5,428,954 A | 7/1995 | Cowan, Sr. | |
| 5,429,102 A | 7/1995 | Edwards et al. | 123/593 |
| 5,495,872 A * | 3/1996 | Gallagher et al. | 138/44 |
| 5,557,917 A | 9/1996 | Jaw | |
| 5,758,488 A | 6/1998 | Batey | |
| 6,145,544 A * | 11/2000 | Dutertre et al. | 138/39 |
| 6,415,747 B1 | 7/2002 | Asano et al. | |
| 6,558,137 B2 | 5/2003 | Tomell et al. | |
| 6,695,094 B2 | 2/2004 | Moffat et al. | |
| 6,776,589 B2 | 8/2004 | Tomell et al. | |
| 6,880,579 B2 * | 4/2005 | Boger | 138/44 |
| 7,089,963 B2 * | 8/2006 | Meheen | 138/44 |
| 7,146,961 B1 * | 12/2006 | Westcott | 123/184.53 |
| 7,210,912 B2 | 5/2007 | Tomell et al. | |
| 7,267,297 B2 | 9/2007 | Campbell et al. | |
| 7,344,107 B2 | 3/2008 | Campbell et al. | |
| 7,364,116 B2 | 4/2008 | Nguyen et al. | |
| 7,367,424 B2 | 5/2008 | Brown et al. | |
| 7,387,188 B2 | 6/2008 | Keller et al. | |
| 7,431,125 B2 | 10/2008 | Williams | |
| 7,448,469 B2 | 11/2008 | Seyler et al. | |
| 7,513,119 B2 | 4/2009 | Zielinski et al. | |
| 7,611,093 B2 | 11/2009 | Campbell et al. | |
| 7,762,374 B2 | 7/2010 | Turner et al. | |
| 7,765,784 B2 | 8/2010 | Lwasa et al. | |
| 7,798,285 B2 | 9/2010 | Chiou et al. | |
| 7,891,605 B2 | 2/2011 | Nguyen et al. | |
| 8,016,071 B1 * | 9/2011 | Martinus et al. | 181/282 |
| 2004/0238123 A1 | 12/2004 | Becknell et al. | |
| 2010/0043447 A1 | 2/2010 | Kirby | |

FOREIGN PATENT DOCUMENTS

| | | |
|---|---|---|
| EP | 2184447 A2 | 5/2010 |
| EP | 2184448 A2 | 5/2010 |

OTHER PUBLICATIONS

US 7,270,294, 09/2007, Campbell (withdrawn)

\* cited by examiner

|  | Plate 1 | Plate 2 | Plate 3 |
|---|---|---|---|
| Number | 1110 | 1110 | 1098 |
| Diameter [in] | 0.120 | 0.120 | 0.180 |
| C-to-C spacing | 0.225 | 0.225 | 0.225 |
| Flow Area [in$^2$] | 12.5538 | 12.5538 | 27.9407 |

HIGH PRESSURE DROP MUFFLING SYSTEM

BACKGROUND

Embodiments are provided that relate generally to muffling systems, and more specifically to muffling systems and apparatus capable of inducing high pressure drops and desirable flow properties. As used herein, the term "fluid" includes gases and liquids.

In a gas turbine engine, air is pressurized in a compression module during operation. The air channeled through the compression module is mixed with fuel in a combustor and ignited, generating hot combustion gases which flow through turbine stages that extract energy therefrom for powering the fan and compressor rotors and generate engine thrust to propel an aircraft in flight or to power a load, such as an electrical generator.

Within at least some known gas turbine engines, a portion of high-pressure air, such as, for example, bleed air from a compressor, is extracted or bled from the compressor for various needs. These needs include, for example, compressor flow bleeding which is used in order to improve operability as well as to provide, turbine cooling, pressurize bearing sumps, purge air or provide aircraft environment control. The air is bled off from the compressor using bleed slots located over specific portions or stages of the compressor. The extracted bleed air is then supplied to various locations in the engine via one or more bleed ports.

The problem: In least some known gas turbine engines, during engine operation occurring in some off-design operating conditions, the compressor may pump more air than is required for needs to include the combustion process. In order to manage operability of the engine and combustion performance, a portion of the excess bleed air from the compressor is routed through bleed conduits and dumped into a by-pass flow stream. The pressure and temperature of the air stream bled from the compressor may be very high. For example, embodiments include those wherein the bleed air stream pressure is greater than 200 psi and the bleed air temperature is greater than about 1000 Deg F. A transient bleed valve system (TBV) system is sometimes used for bleeding and exhausting the air removed from the compressor. Certain conventional designs for ventilation systems that dump the bleed air into the by-pass flow stream use a "Pepper-Pot" design. Such known conventional designs share limitations in that the Mach number of the flow exhausted into the by-pass stream may be high and also that the noise generated may be excessive. Furthermore, conventional designs are limited in that they only work when part of systems having metallic flow path structures that can handle the hot compressor air that is being routed through the TBV system. Additionally, some conventional systems are limited in that all the pressure loads in are managed by relatively few components causing high aero-mechanical loads and a potential for lower fatigue lives for those components. A new approach is required to reduce the pressures and mach numbers of the bleed air entering the by-pass stream or other locations further reducing the noise generated.

The solution: Embodiments are provided for a system that facilitates the reduction of the exposure of the flow path structures to the hot, high pressure and high-mach number air bled from the compressor or other sources. Embodiments are provided that facilitate reduction of the pressure of the flow in the bleed system and facilitate muffling of the noise generated, reduce temperatures and improve other flow properties, while protecting the flow path structures from damage due to exposure to hot air without causing significant disruptions in the flow streams. Additional embodiments and alternatives provide a system and device that exhausts a high-pressure source to a low-pressure sink while managing noise and exit flow distribution. Additionally, a tunable system is provided that is adjustable by easily performing modifications, as desired, to a limited number of components thereby providing pressure and Mach number reductions and also reducing noise.

BRIEF DESCRIPTION OF THE INVENTION

The solution for the above-mentioned problem is provided by the present embodiments to include exemplary embodiments, provided for illustrative teaching and not meant to be limiting, disclosed herein which provide a system for a venting a high-pressure flow stream comprising a device having a plurality of orifice-plates, each orifice-plate having a plurality of orifices, wherein the plurality of orifice-plates are oriented relative to each other such that the pressure of the flow stream substantially drops.

BRIEF DESCRIPTION OF THE DRAWINGS

The subject matter for which patent claim coverage is sought is particularly pointed out and claimed herein. The subject matter and embodiments thereof, however, may be best understood by reference to the following description taken in conjunction with the accompanying drawing figures in which:

DETAILED DESCRIPTION OF THE EMBODIMENTS

Figure 1:
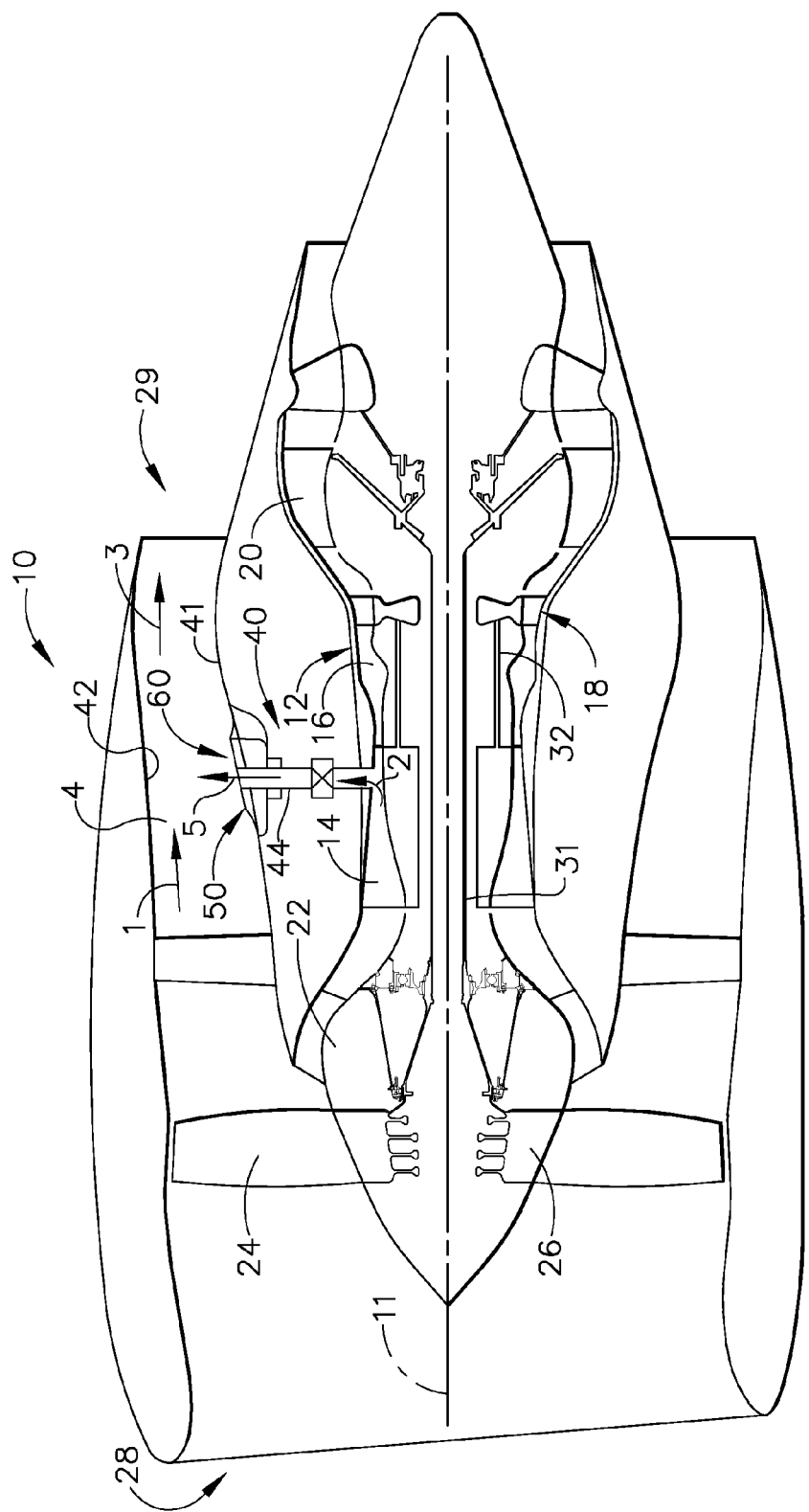
FIG. 1 is a schematic cross-sectional view of an exemplary gas turbine engine assembly having an exemplary vent system having a high pressure drop muffling device according to an aspect of the present invention.

Referring to the drawings wherein identical reference numerals denote the same elements throughout the various views, FIG. 1 shows a schematic cross-sectional view of an exemplary gas turbine engine assembly 10 having an exemplary vent system 40. FIG. 1 shows the gas turbine engine assembly 10 having a longitudinal axis 11. The gas turbine engine assembly 10 includes a core gas turbine engine 12 that includes a high-pressure compressor 14, a combustor 16, and a high-pressure turbine 18. In the exemplary embodiment shown in FIG. 1, the gas turbine engine assembly 10 also includes a low-pressure turbine 20 that is coupled axially downstream from core gas turbine engine 12, and a fan assembly 22 that is coupled axially upstream from core gas turbine engine 12. Fan assembly 22 includes an array of fan blades 24 that extend radially outward from a rotor disk 26. In the exemplary embodiment shown in FIG. 1, engine 10 has an intake side 28 and an exhaust side 29. In the exemplary embodiment, gas turbine engine assembly 10 includes those turbofan gas turbine engines that are available from General Electric Company, Cincinnati, Ohio. Core gas turbine engine 12, fan assembly 22, and low-pressure turbine 20 are coupled together by a first rotor shaft 31, and compressor 14 and high-pressure turbine 18 are coupled together by a second rotor shaft 32.

In operation, air flows through fan assembly blades 24 and compressed air is supplied to high pressure compressor 14. The air discharged from fan assembly 22 is channeled to compressor 14 wherein the airflow is further compressed and channeled to combustor 16. Products of combustion from combustor 16 are utilized to drive turbines 18 and 20, and turbine 20 drives fan assembly 22 via shaft 31. Engine 10 is operable at a range of operating conditions between design operating conditions and off-design operating conditions.

In the exemplary gas turbine engine assembly 10, at certain selected operating conditions, a portion of the compressed air is routed through vent system 40, thereby becoming bleed air 2. Bleed air 2 from compressor 14 enters a bleed flow conduit 44. The bleed air 2 passes through the conduit 44 and enters a high pressure drop muffling device 50 that vents bleed air 2 into a flow path, such as a by-pass flow path 4 and mixes that air with another flow, such as a fan flow stream 1. The bleed flow conduit 44 is made from a variety of material, such as a metal, selected in order to be capable of withstanding a bleed air 2 flow that is relatively hot. The bleed air 2 air temperature varies from about 300 Deg. F. to about 1300 Deg. F. The fan flow stream air 1 may vary in temperature from about 50 Deg. F. to about 300 Deg. F. The high pressure drop muffling device 50, described in more detail herein below, is in flow communication with the bleed flow conduit 44 such that the bleed air 2 is discharged as exit flow stream 5 into by-pass flow path 4 wherein the pressure and mach number of the exit flow stream 5 are substantially reduced by the muffling device 50, and also facilitating a reduction of the noise generated by the mixing of the exit flow stream 5 and fan flow stream 1.

Figure 2:
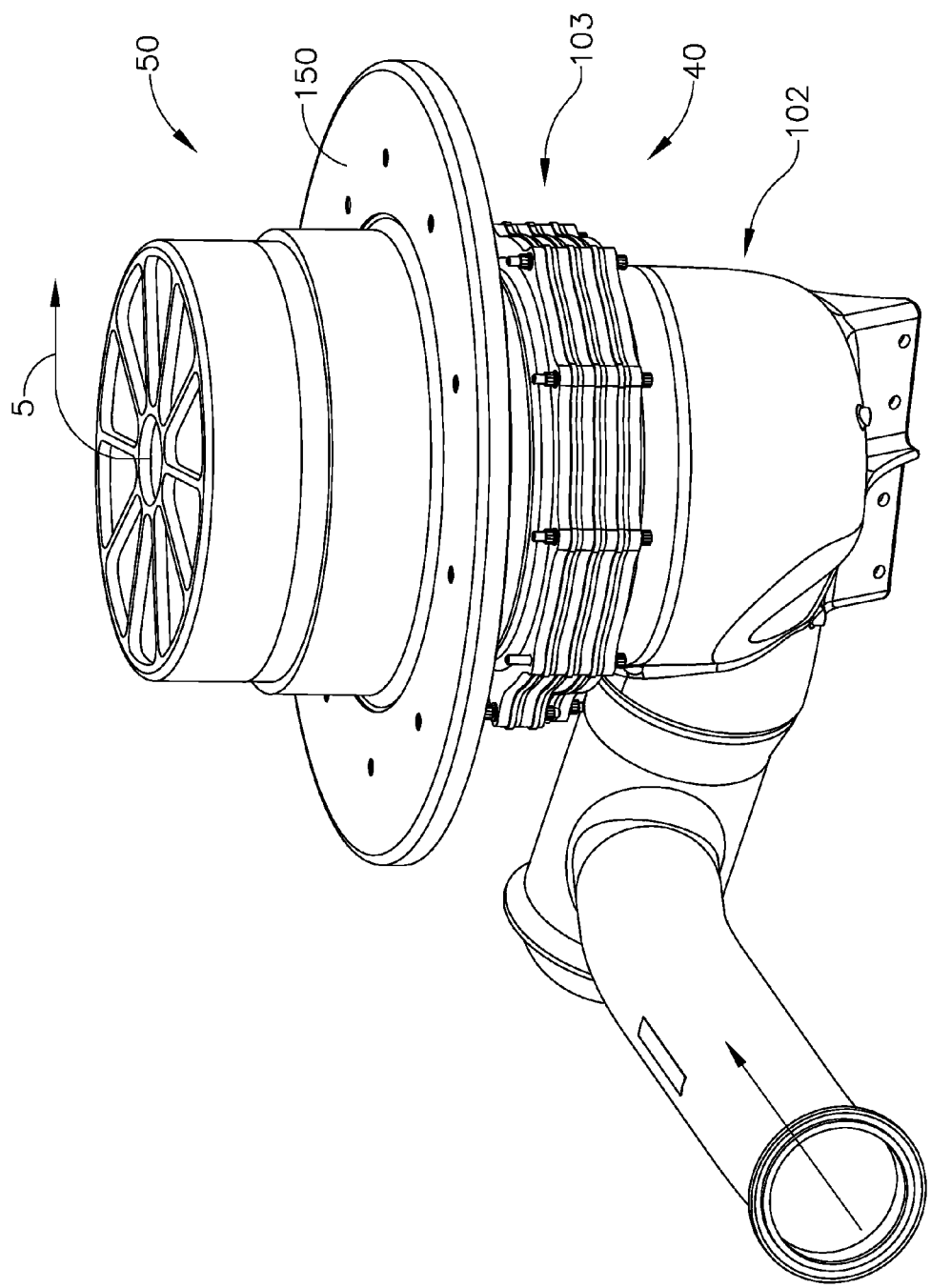
FIG. 2 is an isometric view showing an exemplary embodiment of the present invention that drops high pressure of a hot air stream and flows into a low pressure air stream in a flow path.
Figure 3:
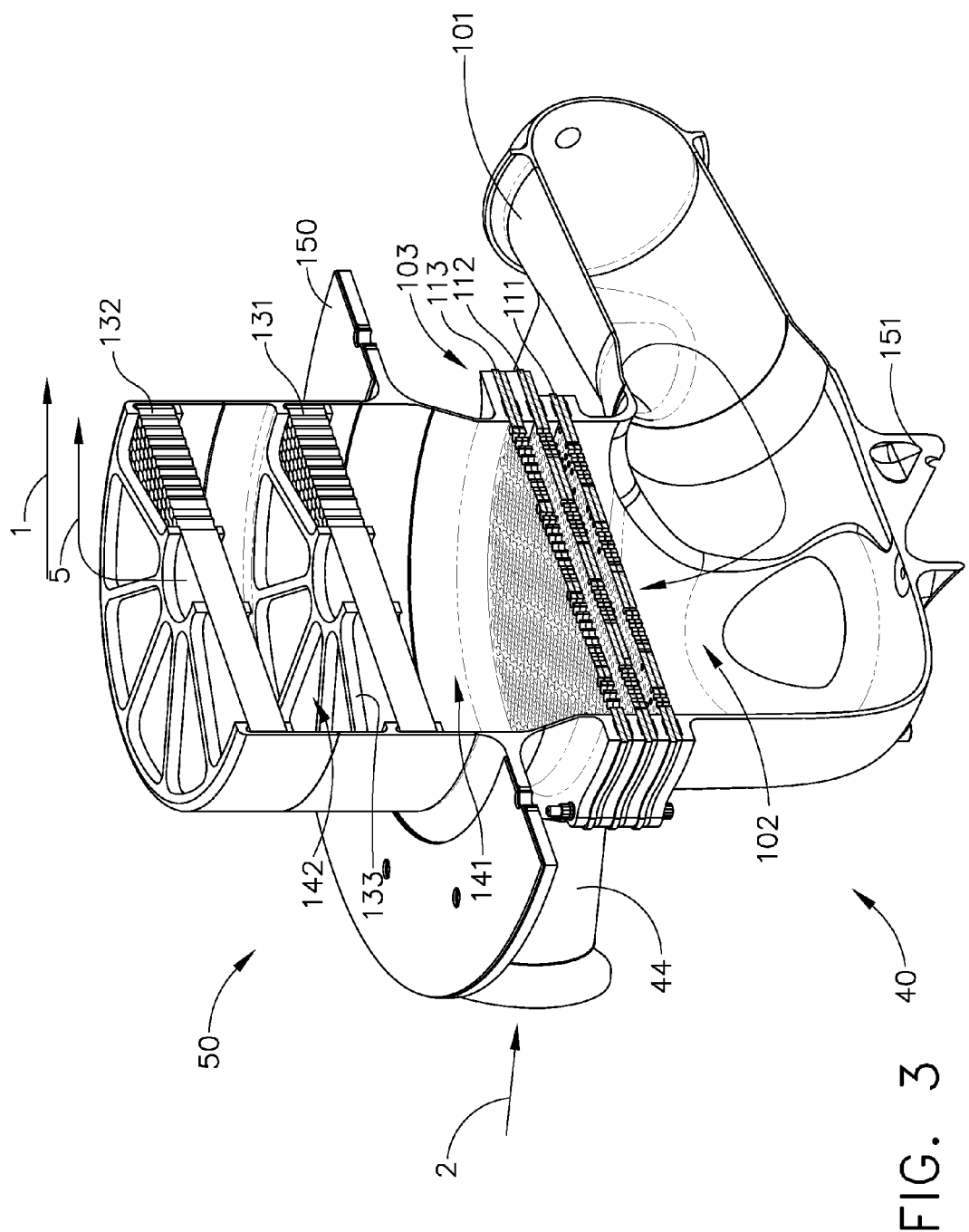
FIG. 3 is an isometric cut-up view of the exemplary embodiment of FIG. 2.
Figure 13:
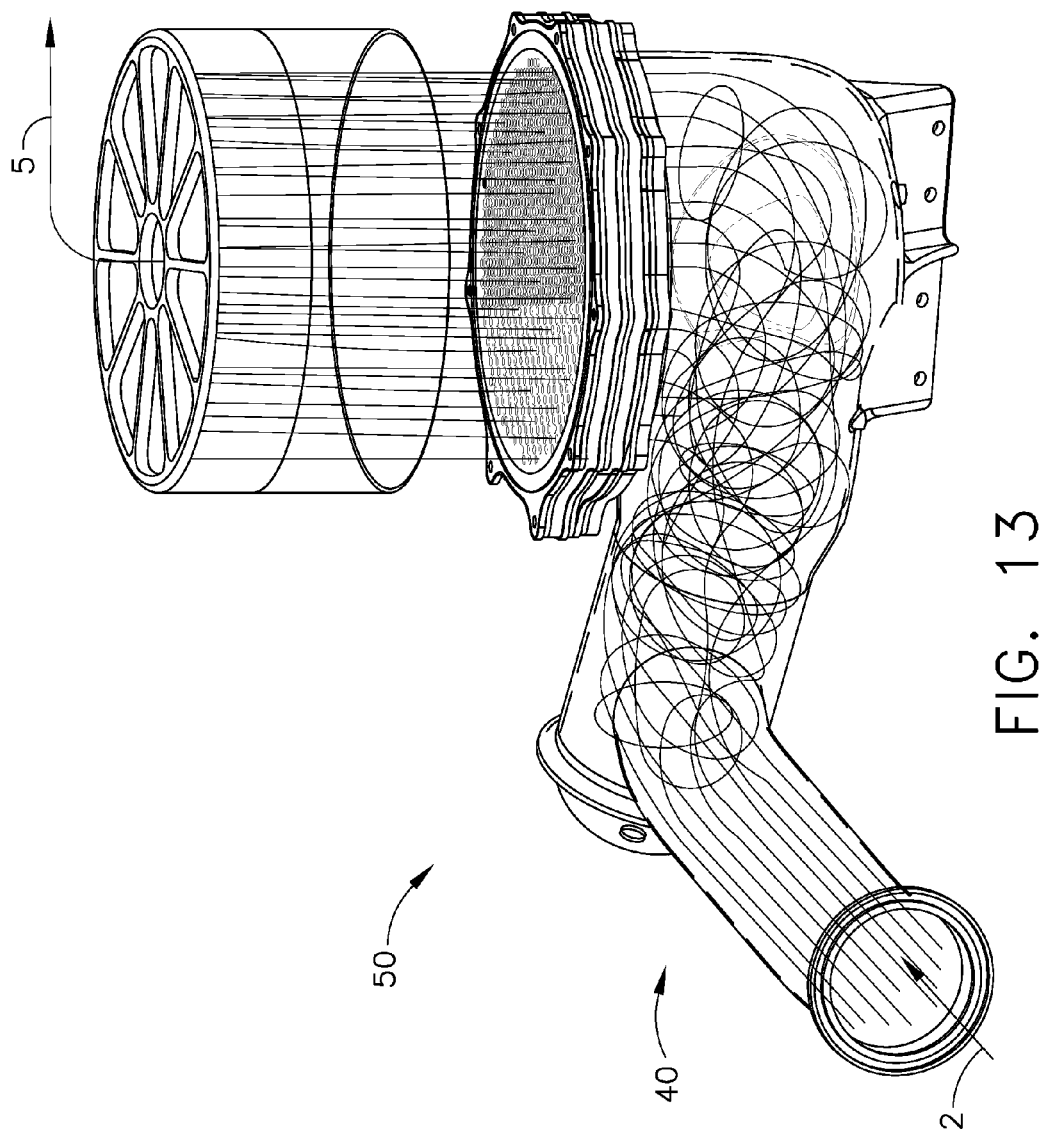
FIGS. 13-14 show an exemplary de-swirling of the motion of air using the stack of orifice plates relating to the exemplary device of FIG. 3.

FIG. 2 shows an isometric view of a vent system 40 having a high pressure drop muffling device 50 according to an exemplary embodiment. The vent system 40 vents a flow of fluid, such as, for example, the relatively hot bleed air stream 2 from the compressor 14 into a relatively cold air stream being fan flow stream 1 in a selected flow path, such as a by-pass flow of the gas turbine engine 10. FIG. 3 shows an isometric, partially cut-up view of the high pressure drop muffling device 50 according to an exemplary embodiment. In further detail, the vent system 40 comprises an inlet conduit, here for example, the bleed flow conduit 44 and also as shown schematically in FIG. 1. Conduit 44 supplies the bleed air 2 from a source, such as the compressor device 14. The bleed air 2 is flown into the device 50 by an inlet flow conduit 101. The high pressure bleed air stream from the inlet air conduit enters a plenum 102. With reference to FIG. 13, the inlet flow conduit 101 and the plenum 102 are selectably chosen, as desired, in order to provide a swirling air motion.

Referring back to FIG. 3 and in further detail, the high pressure drop muffling device 50 comprises diffusive structure to include an orifice plate stack 103. The orifice plate stack 103 has at least one orifice plate 111 having at least one orifice including a first orifice 121. As desired, the orifice plate stack 103 has a plurality of orifice plates, such as for example first orifice plate 111, second orifice plate 112 and third orifice plate 113 as shown in FIGS. 3-6. As will be seen in the exemplary embodiments to follow, the values selected for the size of the orifices are considered in fine tuning. For example, some embodiments provide that the size values for all orifices are equivalent. Other embodiments provide that each orifice plate has orifices of a different size than the orifices present on the other plates. Other embodiments provide for a plurality of combinations for number, size and placement of orifices and sizes as desired in order to fine tune the device 50.

Figure 4:
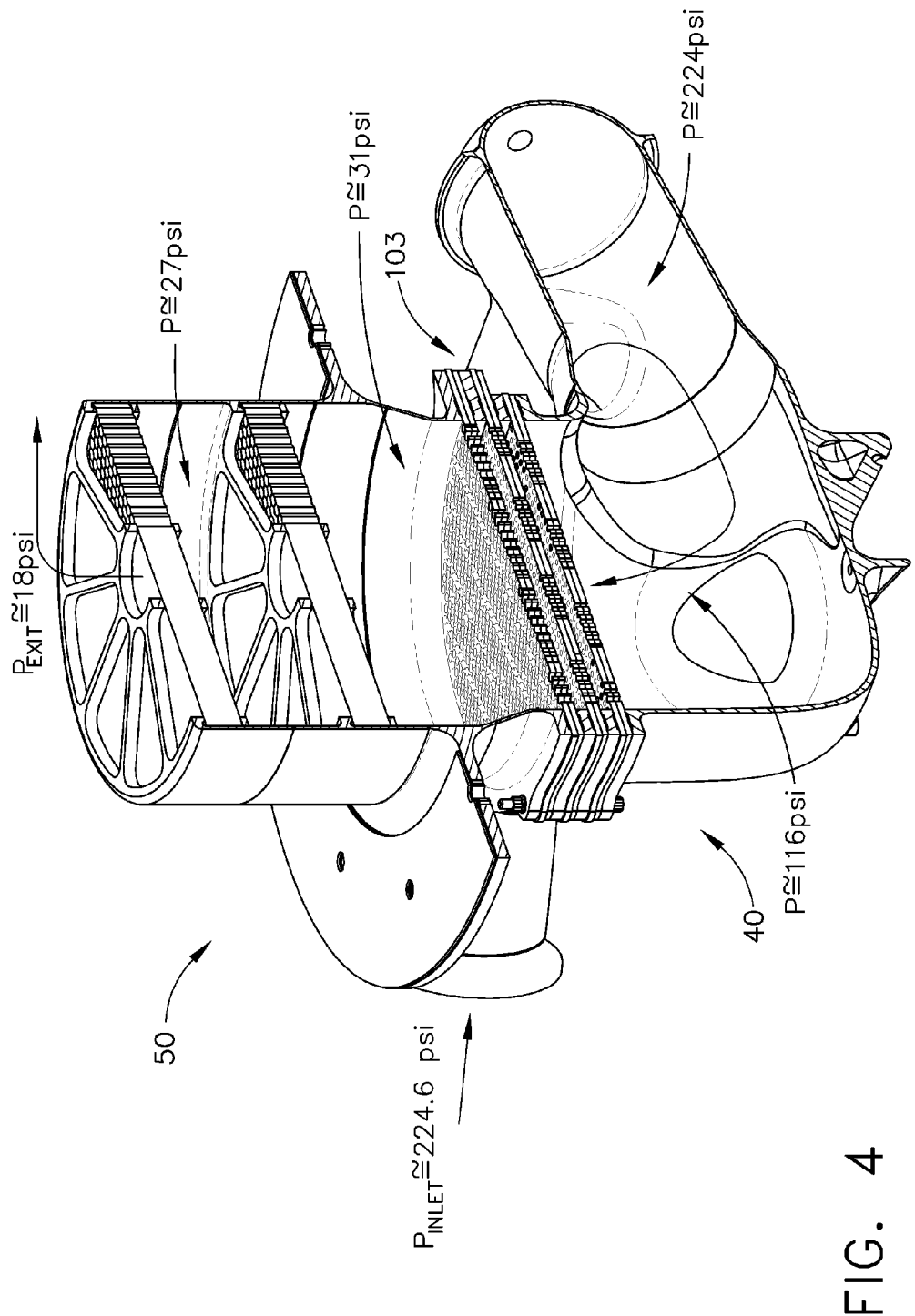
FIG. 4 shows exemplary pressure levels in the exemplary device of FIGS. 2 and 3.
Figure 5:
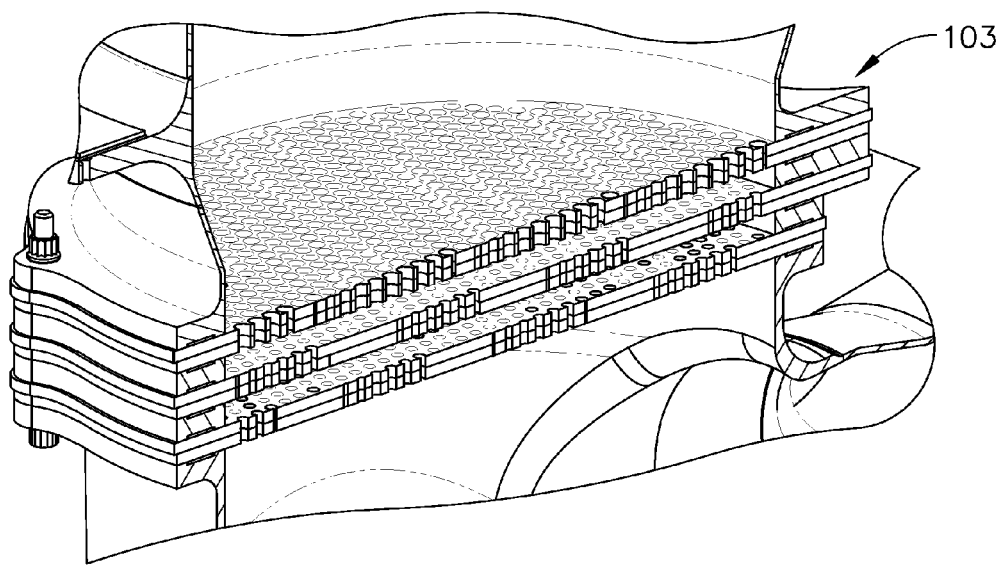
FIGS. 5-9 show details for an exemplary stack of orifice plates relating to the exemplary embodiment of FIG. 3.

In further detail and by example, for selected embodiments, the orifice plates 111-113 have one or more orifices. As desired, the size of the orifices is selected wherein the first orifice 121 has a first size. In addition, the second orifice plate 112 has one or more second orifices 123 of a second size and the third orifice plate 113 has one or more corresponding orifices of a third size. With reference to FIG. 4, embodiments include those wherein the orifice plates 111-113 are stacked relative to each other such that the pressure of the flow from the plenum 102 drops significantly as it passes through the orifices 121 of the orifice plates 111-113. The pressure of the flow is further dropped by using one or more layers of flow straightener such, as, for example, flow straighteners formed in a honeycomb shape. Referring to FIG. 3, a first honeycomb layer 131 is used to further drop the pressure of the flow. Alternatives include a plurality of such honeycomb layers, such as, for example, a second honeycomb layer 132 as shown in FIG. 3. In the exemplary embodiment shown herein, the honeycomb has a ⅛ in cell made from 3 mil ribbon. The orifice plates 111-113 and honeycomb layers 131, 132 are made from materials, as desired, to include nickel base super alloys, and titanium alloys, HastX or other materials. In the exemplary embodiment shown herein, the honeycomb is supported by a suitable support structure 133, such as shown in FIG. 3. As desired, the honeycomb is brazed for reinforcement and attached to the support structure 133 using known attachment methods.

Figure 6:
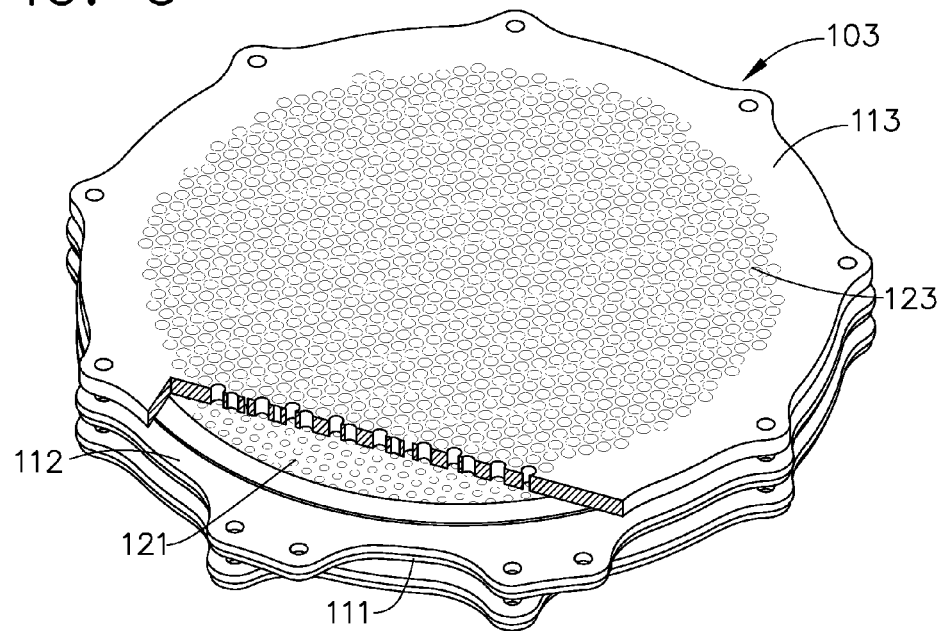
Figure 7:
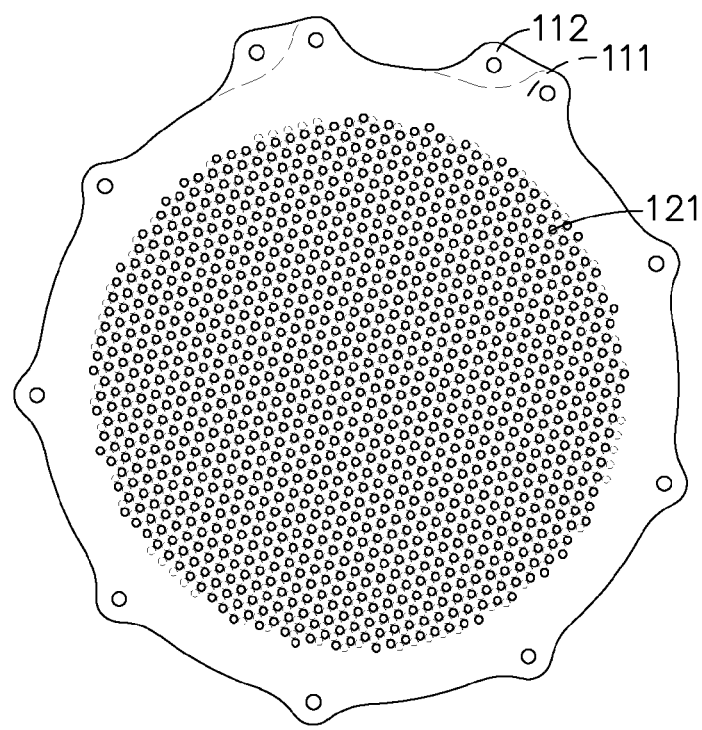
Figure 8:
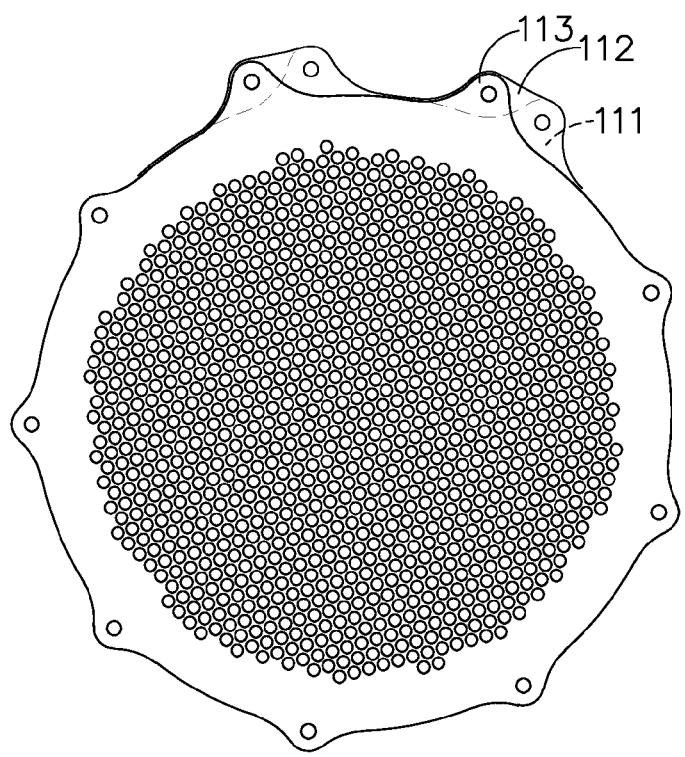
Figure 9:
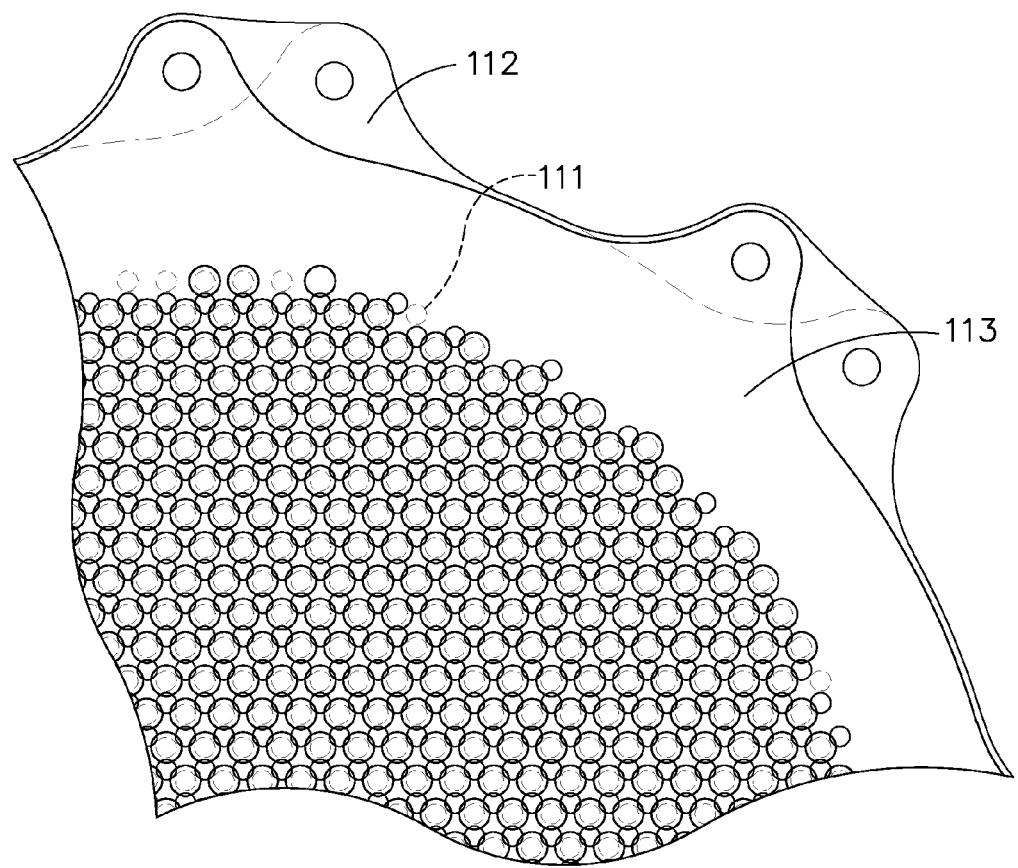

The exemplary embodiment shown in FIGS. 3-10 includes three orifice plates 111, 112, and 113, and two honeycomb layers 131 and 132. However the design of the device 50 lends itself to alternatives in that adding or subtracting honeycomb layers and/or orifice plates, as desired, yields a fine tuning of the muffling device 50 and vent system 40 in order to achieve suitable flow and noise characteristics. In further detail, by selecting the relative size, spacing and flow area of the orifices 121, as desired, a user fine tunes the flow characteristics such as, for example the pressure and Mach number, and the noise characteristics to reduce the noise. For example and with reference to FIG. 6, first orifice 121 and second orifice 123 are provided wherein second orifice 123 is illustrated, for purposes of this example only, to be formed wherein the second size is greater, being larger in diameter than the first size of first orifice 121. FIG. 6 also illustrates the relative location of the orifices 121, 123 in successive orifice plates 111-113 in the orifice plate stack 103, with further details of an exemplary stack 103 also shown in FIGS. 7-9. FIGS. 5-9 show yet further details of an exemplary embodiment of orifice plate stack 103. In the exemplary embodiment and with reference to FIG. 7, orifice plates 111 and 112 are stacked such that there is no line-of-sight through orifice plates 111 and 112. As shown, for example only, the plates 111 and 112 have the same number of holes, hole size, spacing and pattern, but the plates 111, 112 are rotated 60 degrees from each other such that there is no line of sight through their respective orifices 121. This orientation of the orifice plates 111-112 provides that the flow through the first orifice plate 121 impinges on a wall portion of the second orifice plate 112. FIGS. 8 and 9 show three orifice plates 111-113 stacked such that plate 113 can "see" plate 111 but plate 111 cannot fully "see" plate 113.

Figures 10, 11:
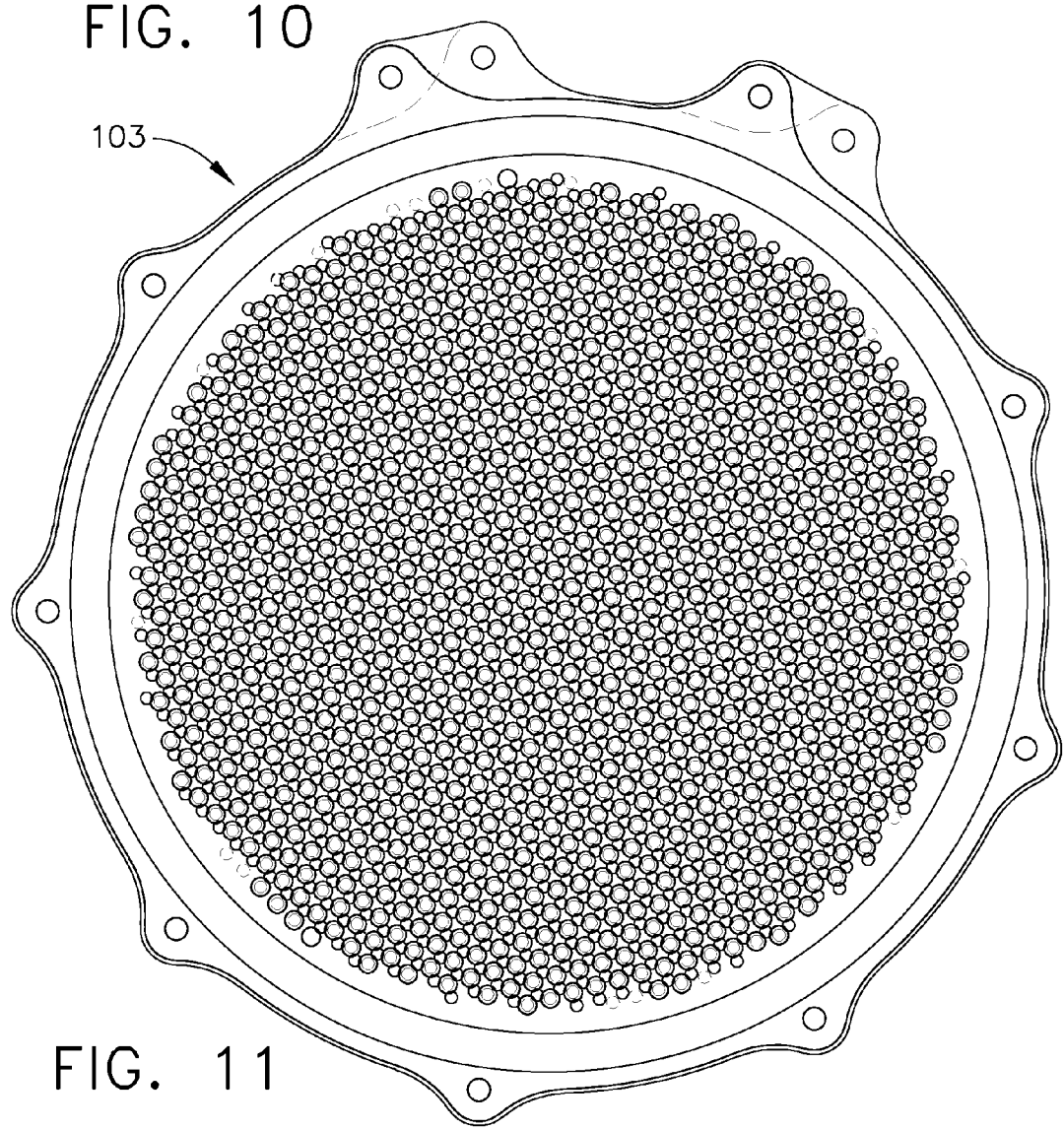
FIGS. 10-12 show an exemplary arrangement of orifices in the orifice plates for the exemplary embodiment shown in FIG. 3.
Figure 12:
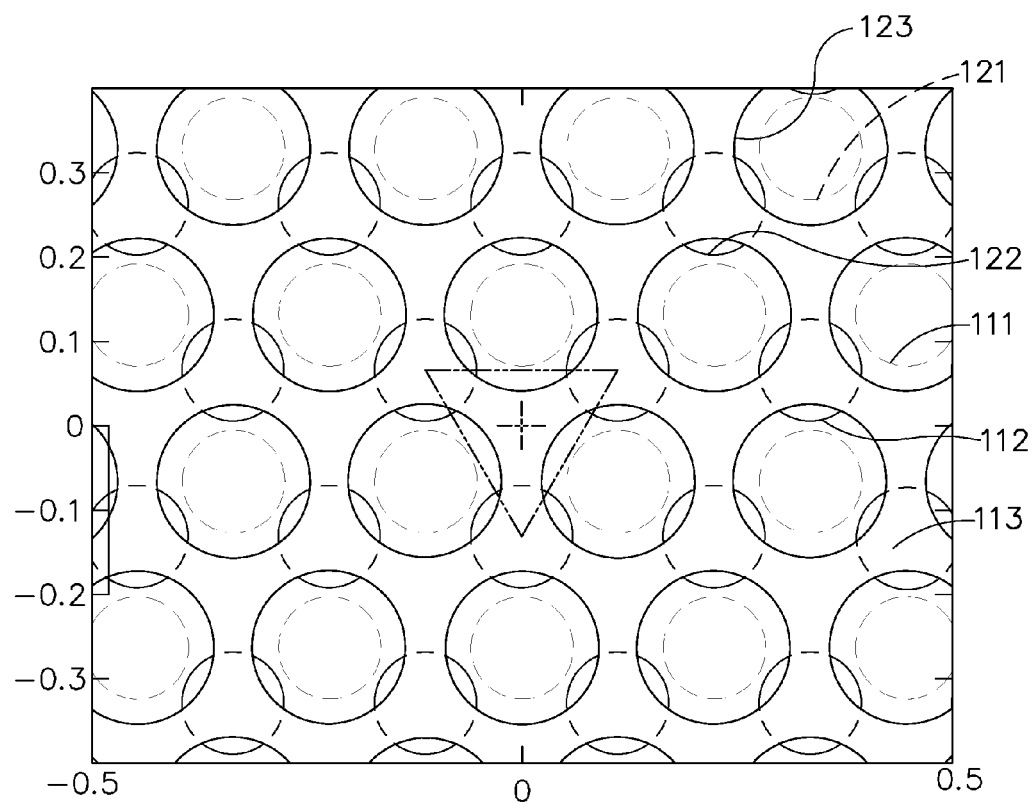

FIG. 9 is an enlarged view of a portion of the plate stack 103 shown in FIG. 8. FIGS. 10, 11 and 12 show further details for an exemplary orifice plate stack 103 having three orifice plates 111-113.

With respect to noise reduction, as compared to results from use of a "standard" pepper-pot as found in a range of diameters, embodiments provide a fine-tuned selection of components that achieve significant noise reduction expressed as a percentage drop in noise from known pepper pot designs. For example, alternatives include those for which reductions in noise of at least 30% are achieved by fine-tuning. By further example, embodiments include those wherein the conduit 44 is formed in a 9 inch diameter.

Figure 14:
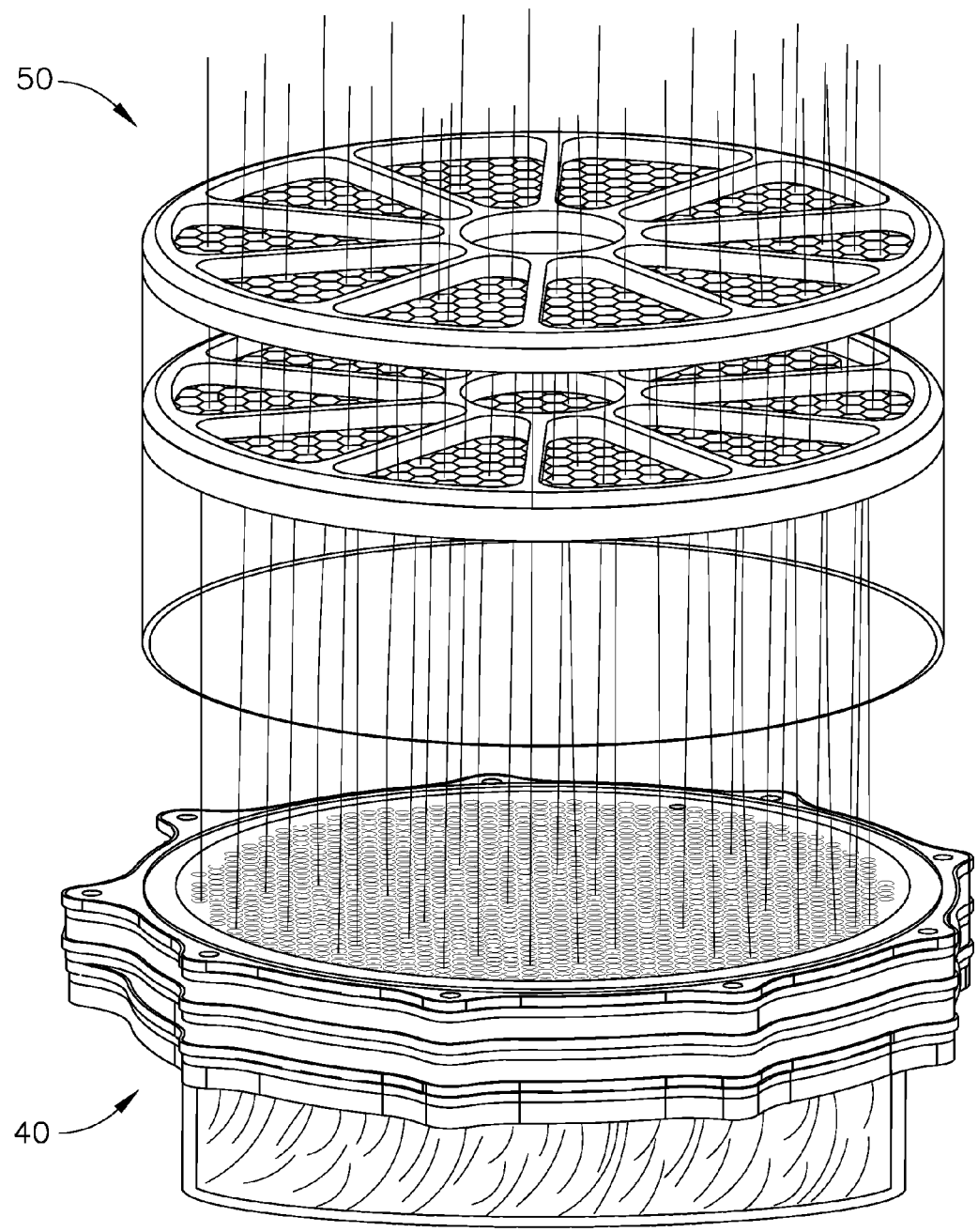

Referring back to FIG. 4, in an exemplary embodiment provided for purposes of illustration and not intended to be limiting, results are shown for a sequence of pressure drops achieved by such an exemplary embodiment of the high pressure drop muffler 50 and diffusive structure shown herein. For example, an inlet pressure, Pinlet, of about 224 psi drops measurably by use of the diffusive design of the inlet flow conduit 101 and the plenum 102. With reference also to FIGS. 13 and 14, as the fluid moves through the device 50, the turning and swirling motion of the fluid flow induced by the geometric design of inlet flow conduit 101 and the plenum 102 helps to drop the pressure to about 116 psi. Once the fluid clears the orifice plate stack 103 having three orifice plates 111-113 oriented as described above further, the pressure is reduced to 31 psi. In an exemplary embodiment as described in FIG. 10 (e.g., first orifice plate 111 and second orifice plate 112 having substantially the same flow area (e.g., about 12.5538 square inches) and the third orifice plate 113 having a substantially greater flow area (e.g., about 27.9407 square inches)), one of skill in the art will recognize that a pressure drop as illustrated in FIG. 4 (e.g., from about 116 psi to about 31 psi) across orifice plate stack 103 may result from a choked condition at second orifice plate 112 and unchoked conditions at first orifice plate 111 and third orifice plate 113. The flow then enters an inner cavity 141. The flow passes through the first honeycomb layer 131 and the flow pressure drops to about 27 psi. In the exemplary embodiment shown, the flow passes through a second honeycomb layer 132 and the pressure drops further to an exit pressure, Pexit, of about 18 psi. The device 50 is compact, unlike known systems. One of the advantages of the device 50 shown herein is that a significant portion of pressure drop (and reductions in Mach numbers) occurs in the plenum 102 and the orifice plates 111-113 that are located upstream from the exit point into the bypass stream. Therefore the device 50 generates significantly lower noise in the bypass stream than other devices. It should be noted that the relative orientations of the orifices 121 (and 123 where indicated) in the orifice plates 111-113 have the effect of de-swirling the air as it passed from the plenum 102 into the inner cavity 141, through the first honeycomb layer 131 into the outer cavity 142.

This written description uses examples to disclose embodiments and to enable any person skilled in the art to make and use what is claimed. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A device for reducing pressure of a fluid comprising:
    an inlet flow conduit that channels a flow having an inlet pressure into a plenum, wherein the inlet flow conduit and the plenum are configured to induce a turning and swirling motion in the flow;
    an orifice plate stack comprising a plurality of orifice plates coupled to the plenum such that the flow from the plenum flows through a plurality of orifices in the orifice plates into an inner cavity, each orifice plate having a plurality of orifices such that pressure of the flow from the plenum to the inner cavity is reduced as it flows through the orifice plate stack; and
    a flow straightener layer coupled to the inner cavity such that the flow from the inner cavity exits through the flow straightener layer such that the device reduces the pressure of the fluid from the inlet pressure to an exit pressure;
    wherein a first orifice plate in the orifice plate stack has a first orifice having a first size, a second orifice plate has a second orifice having a second size, and a third orifice plate has a third orifice having a third size;
    wherein the first orifice plate and the second orifice plate are oriented relative to each other such that a flow through the first orifice impinges on a wall portion of the second orifice plate;
    wherein a flow area of the first orifice plate and a flow area of the second orifice plate are substantially the same;
    wherein the third orifice plate has a flow area that is substantially greater than the flow area of the first orifice plate and the flow area of the second orifice plate; and
    wherein the flow causes a choked condition at the second orifice plate and an unchoked condition at the first orifice plate and the third orifice plate.

2. The device of claim 1 wherein the flow straightener is formed in a honeycomb shape.

3. The device of claim 1 further comprising a plurality of flow straightener layers.

4. The device of claim 2 wherein the flow straightener is supported by a frame.

5. The device of claim 4 wherein the flow straightener is brazed for reinforcement.

6. The device of claim 1 wherein the orifice plate stack is arranged such that the noise induced by the flow as it flows through the device is reduced.

7. The device of claim 1 wherein an orientation of the orifice plates relative to each other is adjustable to facilitate a reduction in noise.

8. The device of claim 1 wherein the number of orifice plates and size of the orifices in the orifice plates are selected such that the noise generated by the device is facilitated to be reduced.

9. The device of claim 2 wherein the honeycomb layer is sized to facilitate a reduction in noise generated by the device.

10. The device of claim 1 wherein the flow exiting from the device has a substantially uniform flow profile.

11. The device of claim 1 wherein the pressure drop of a flow having a high mach number occurs substantially away from the location where the flow exits from the device.

12. The device of claim 1 wherein the noise characteristics of the device are tunable.

13. The device of claim 12 wherein the noise characteristics of the device are capable of being tuned by adding or removing an orifice plate.

14. The device of claim 12 wherein the noise characteristics of the device are capable of being tuned by adjusting the relative orientations of the orifices in an orifice plate.

15. The device of claim 12 wherein the noise characteristics of the device are capable of being tuned by adding or removing a honeycomb layer.

16. The device of claim 12 wherein the tunable noise characteristics achieve a noise reduction of at least 30 percent.

17. A system for venting a high-pressure flow stream comprising a device having a plurality of orifice plates, each orifice-plate having a plurality of orifices, wherein the plurality of orifice plates are oriented relative to each other such flow through a first orifice plate impinges on a wall portion of a second orifice plate such that the pressure of the flow stream substantially drops, the first orifice plate and the second orifice plate having substantially the same flow areas, wherein the first orifice plate and the second orifice plate are followed by another of the plurality of orifice plates having a flow area substantially greater than the first orifice plate and the second orifice plate.

18. The system of claim 17 wherein the device facilitates reducing the noise generated by the venting system.

19. The system of claim 17, wherein the high-pressure flow stream is supplied to the plurality of orifice plates via an inlet flow conduit and a plenum, wherein the inlet flow conduit and the plenum are configured to induce a turning and swirling motion in the flow.

20. The system of claim 17, further comprising flow straightener following the plurality of orifice plates.

21. The system of claim 20, wherein the flow straightener is formed in a honeycomb shape.

22. The system of claim 21, wherein the noise characteristics of the system are capable of being tuned by adding or removing a honeycomb layer.

23. The system of claim 17, wherein the noise characteristics of the system are capable of being tuned by adding or removing an orifice plate.

* * * * *